US006747210B2

(12) United States Patent
Chen

(10) Patent No.: US 6,747,210 B2
(45) Date of Patent: Jun. 8, 2004

(54) METHOD OF CABLE ASSEMBLY WITH ELECTROMAGNETIC INTERFERENCE PROTECTION AND STRUCTURE THEREOF

(75) Inventor: Cheng-Che Chen, Taoyuan Hsien (TW)

(73) Assignee: QuantamComputer Inc., Taoyuan Hsien (TW)

(*) Notice: Subject to any disclaimer, the term of this patent is extended or adjusted under 35 U.S.C. 154(b) by 0 days.

(21) Appl. No.: 10/301,725

(22) Filed: Nov. 22, 2002

(65) Prior Publication Data

US 2004/0050576 A1 Mar. 18, 2004

(30) Foreign Application Priority Data

Sep. 13, 2002 (TW) ....................................... 91121076 A

(51) Int. Cl.[7] ................................................ H02G 15/02
(52) U.S. Cl. ....................................... 174/74 R; 174/78
(58) Field of Search ................................ 174/74 R, 78, 174/75 C, 84 R

(56) References Cited

U.S. PATENT DOCUMENTS 3,624,594 A * 11/1971 Trimble et al. ............ 439/523
4,325,598 A * 4/1982 Leonardo ..................... 439/98
4,917,615 A * 4/1990 Franks, Jr. ................... 439/98
5,722,840 A * 3/1998 Auclair et al. ................ 439/98
5,967,805 A * 10/1999 Auclair et al. .............. 439/100
6,322,378 B1 * 11/2001 Auclair ........................ 439/99

* cited by examiner

*Primary Examiner*—William H. Mayo, III

(57) ABSTRACT

A method of cable assembly with electromagnetic interference protection and a structure thereof are described. The cable comprises a transmission cable, a ground cable, and metal rings. The transmission cable connects the liquid crystal display and a motherboard of a notebook computer. The insulating cover of the ground cable is peeled off in at least one position of an insulating cover and exposes an internal conductive wire. The exposed positions correspond to positions of clips of the notebook computer. The conductive wire and the transmission cable are clamped in the metal rings, and therefore the electromagnetic interference noises transmit to a ground of the notebook computer.

16 Claims, 4 Drawing Sheets

METHOD OF CABLE ASSEMBLY WITH ELECTROMAGNETIC INTERFERENCE PROTECTION AND STRUCTURE THEREOF

FIELD OF THE INVENTION

The present invention relates to a method and structure of a cable assembly with electromagnetic interference protection and especially to a method and structure of a liquid crystal display cable assembly with electromagnetic interference protection.

BACKGROUND OF THE INVENTION

Information technology and the computer industry are highly developed now. Portable electronic devices, and especially notebook computers, are used more popularly. Notebook computers are becoming increasingly smaller, and so the electronic parts thereof must be reduced in size and the operating speed thereof enhanced. The display area of the liquid crystal display (LCD), however, needs to be enlarged for the user.

Normally, an LCD cable is necessary for power and signal transmission between the motherboard and the LCD in a notebook computer. Due to the LCD cable connecting the motherboard and the LCD, electromagnetic interference (EMI) noises of the motherboard radiate from the LCD cable. A shield is designed for preventing the EMI noises to eliminate the EMI noise generated by the electromagnetic wave; LCD interference is consequently reduced and the operating system works more smoothly. One end of the LCD cable must connect with the ground of the computer to dissipate the electromagnetic interference.

FIG. 1 is a schematic view of a traditional LCD cable with a ground cable. A traditional LCD cable 100 has a transmission cable 130 and a ground cable 120. The transmission cable 130 connects with the motherboard of a computer and the LCD to transfer power and data thereto. The ground cable 120 transfers EMI noise to the ground of the computer to eliminate the disturbance by the EMI noises. Normally, the LCD cable 100 couples with the ground of the computer by way of a ground terminal 110 attached to the end of the ground cable 120. The ground terminal 110 is usually clamped on the ground cable 120.

FIG. 2 is a schematic view of the traditional LCD cable installed on a metal fixing plate of a notebook computer. As the drawing shows, a plurality of clips 220 is mounted on the metal fixing plate 210 for fastening the transmission cable 130 of the LCD cable 100. The ground cable 120 is directly screwed on the metal fixing plate 210 with a fixing bolt 230. The metal fixing plate 210 directly connects with the ground of the computer. Therefore, the ground cable 120 delivers the EMI noise to the ground of the computer by way of the metal fixing plate 210.

The conventional computer fulfills the EMI specification because the LCD cable 100 can transmit the EMI noises to the ground of the computer but the ground terminal 110 attached to the end of the ground cable 120 is screwed on the metal fixing plate 210 by the fixing bolt 230 when the computer is assembled. The fixing bolt 230 is unscrewed to release the ground terminal 110 when the LCD cable 100 is removed from the metal fixing plate 210 of the computer. Assembly time thus increases due to the screwing process. Repair time for the computer also increases if the fixing bolt 230 needs to be unscrewed during the repair process, and especially if the fixing bolt 230 is repeatedly screwed and unscrewed during the repair process. Repair process time is further increased because the fixing bolt 230 must be checked and distinguished from the other bolts removed during the repair process. Furthermore, if the ground cable 120 gets loose from the metal fixing plate 210 or the ground terminal 110, the ground cable 120 may touch the motherboard of the computer to cause a short or seriously damage the computer. Therefore, the ground cable has to be secure on the metal fixing plate of the computer, connect with the ground of the computer, reduce installation and removal time, and efficiently avoid the ground cable getting loose from the ground terminal.

SUMMARY OF THE INVENTION

One object of the present invention is to utilize a metal ring to fix the transmission cable and the ground cable, whereby the ground cable can utilize a clip made of a conductive material to transmit the EMI noise to the ground of the computer.

Another object of the present invention is to utilize the metal ring to simplify the computer assembly process and especially the computer repair process.

A further object of the present invention is to secure the transmission cable and the ground cable together to avoid the ground cable contacting other electronic parts and reduce the risk while the computer is working.

The present invention provides an assembly method of a cable with electromagnetic interference protection for an electric appliance, such as a notebook computer. The method comprises the following steps. First, conductive clips are connected with a ground circuit of the electric appliance. Second, at least one position of an insulating layer of a ground wire of the cable is peeled off to expose an internal conductive metal wire. The exposed position corresponds to the conductive clip position. Then, at least one metal ring is used to fix the position of the ground wire and a transmission wire of the cable. Finally, the metal ring, the transmission wire, and the ground wire arc pressed into the conductive clips to fix the cable in the conductive clips and to connect the internal conductive metal wire with the ground circuit of the electric appliance.

The cable includes a liquid crystal display cable to connect the liquid crystal display and the motherboard of a notebook computer. The cable transmits a power and signals between the liquid crystal display and the motherboard of the notebook computer. The internal conductive metal wire connects with the ground circuit of the electric appliance to transmit electromagnetic interference (EMI) noises to the ground circuit of the electric appliance.

Another aspect of the present invention is to provide a cable with electromagnetic interference protection for an electric appliance. The cable comprises a plurality of conductive clips, a transmission wire, a ground wire, and at least one metal ring. The conductive clips are mounted on a fixing plate of the electric appliance and the conductive clips connect with a ground circuit of the electric appliance. The transmission wire connects a plurality of elements of the electric appliance. The ground wire has at least one contact position of an insulating layer of the ground wire of the cable. The contact position exposes an internal conductive metal wire and the contact position corresponds to the conductive clip position. The metal ring clasps the transmission wire and the ground wire at the contact position to connect the metal ring with the internal conductive metal wire.

The conductive clips are made of metal material. The cable comprises a liquid crystal display cable to transmit power and signals between a liquid crystal display and a motherboard of a notebook computer. The internal conductive metal wire connects with the ground circuit of the notebook computer to transmit electromagnetic interference (EMI) noise to the ground circuit of the notebook computer.

Therefore, the cable according to the present invention connects the ground of the electric appliance efficiently, simplifies the assembly process, avoids the ground getting loose, and increases the efficiency of the repair process.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
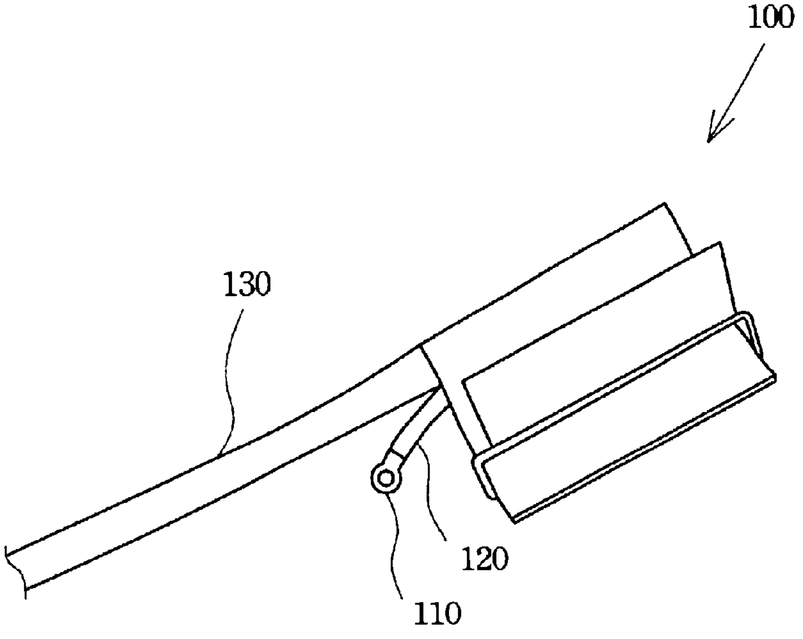
FIG. 1 (PRIOR ART)
FIG. 1 is a schematic view of a traditional LCD cable with a ground cable.
Figure 2:
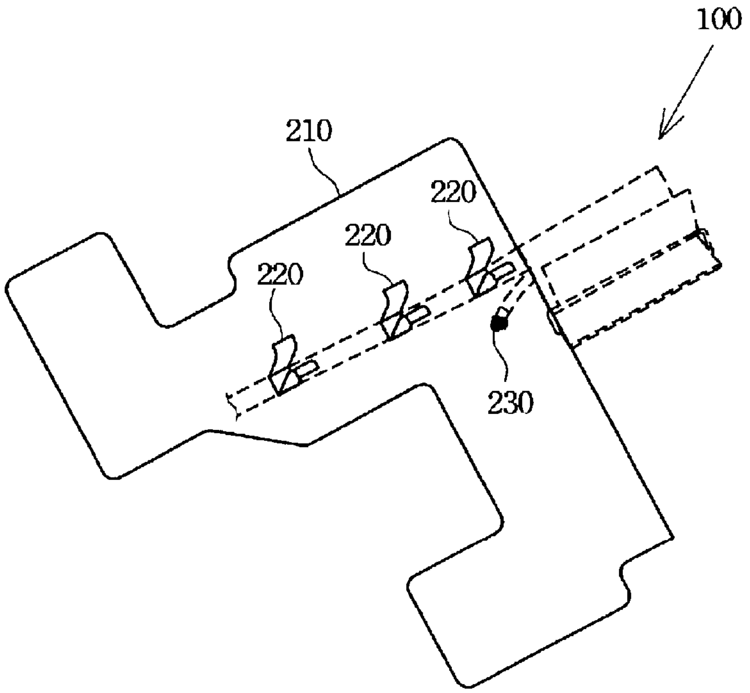
FIG. 2 (PRIOR ART)
FIG. 2 is a schematic view of the traditional LCD cable installed on a metal fixing plate of a notebook computer.
Figure 3:
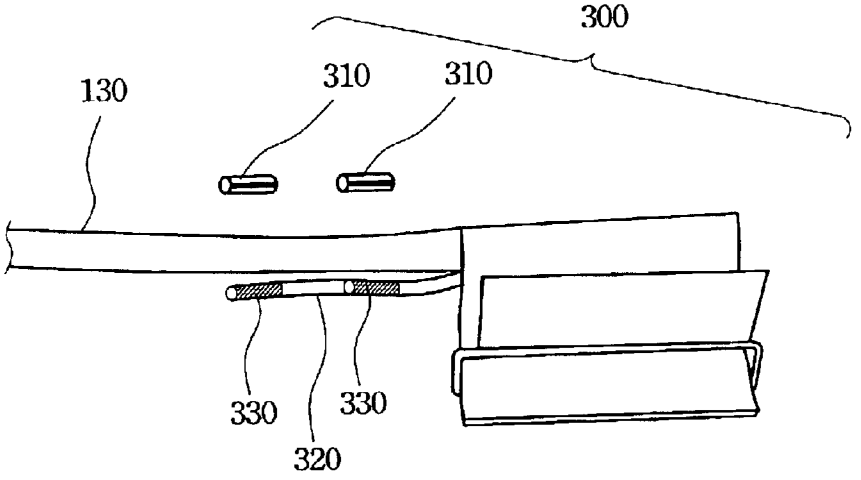
FIG. 3 is a schematic view of a LCD cable according to the present invention.

FIG. 3 is a schematic view of an LCD cable according to the present invention. The LCD cable 300 according to the present invention includes a transmission cable 130, a ground cable 320, and metal rings 310. An insulating cover of the ground cable 320 of the LCD cable 300 according to the present invention is partially peeled off and exposes the conductive wire at exposed positions 330. The ground cable 320 and the transmission cable 130 are attached together by the metal rings 310 at these exposed positions 330.

Figure 4:
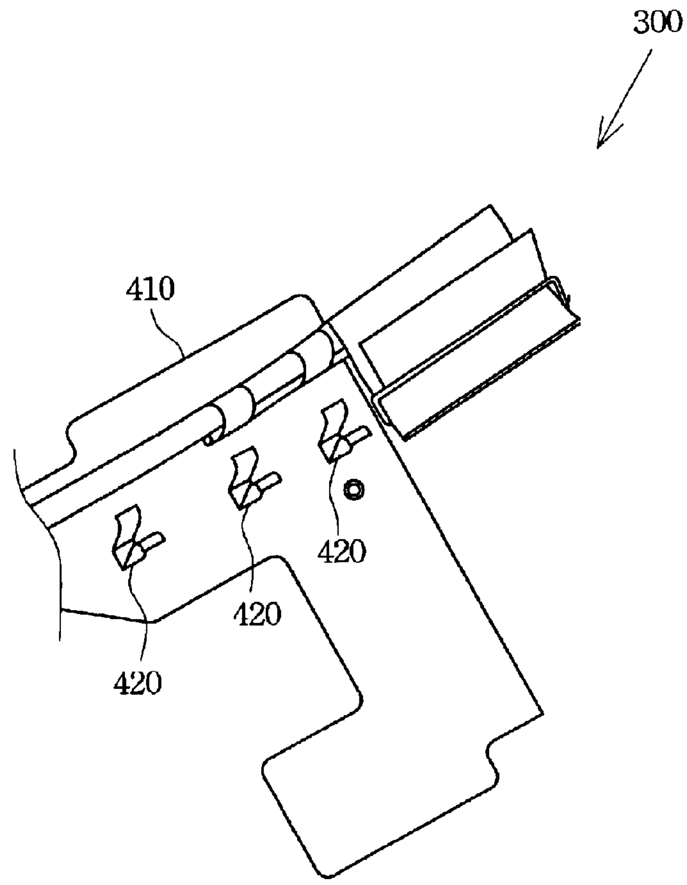
FIG. 4 is a schematic view of the LCD cable according to the present invention installed on a metal fixing plate of a notebook computer.

FIG. 4 is a schematic view of the LCD cable according to the present invention installed on a metal fixing plate of a notebook computer. Installation of the LCD cable 300 according to the present invention on the fixing plate 410 is accomplished merely by pressing the transmission cable 130 and the ground cable 320, already attached together by the metal rings 310, into the ground clips 420. The ground clips 420 made of a conductive material, such as metal, connect with the ground of the notebook computer. Therefore, the ground cable 320 already connects with the ground of the notebook computer via the metal rings 310 and the ground clips 420 after the ground cable 320 is pressed into the ground clips 420. Hence the fixing bolt and the screw hole for screwing the fixing bolt are no longer necessary.

The insulating cover of the ground cable 320 of the LCD cable 300 according to the present invention is partially peeled off to expose the conductive wire of the ground cable 320 at the exposed positions 330 corresponding to the positions of the ground clips 420. The LCD cable 300 is directly mounted in the ground clips 420 due to the metal rings 310 being mounted in the ground clips 420. Because the LCD cable 320 is securely mounted on the fixing plate, the ground cable 320 is also securely mounted on the fixing plate 410. Even if part of the LCD cable 300 gets loose from the fixing plate 410, for example, if one metal ring 310 gets loose and the other metal rings 310 are still mounted in place on the fixing plate 410, the ground cable 320 does not contact the electronic parts on the motherboard. Furthermore, the ground cable 320 is secured to the transmission cable 130 with the metal rings 310 very well and the transmission cable 130 is mounted on the fixing plate 410 in at least two positions, and normally more than two. Therefore, the ground cable 320 is better assembled on the fixing plate 410 and the notebook computer can work more safely.

The method and structure of a cable assembly with electromagnetic interference protection can be used not only in a computer but also in a household electric appliance. As is understood by a person skilled in the art, the foregoing preferred embodiments of the present invention are illustrative of the present invention rather than limiting of the present invention. It is intended that various modifications and similar arrangements be included within the spirit and scope of the appended claims, the accorded the broadest interpretation so as to encompass all such modifications and similar structures.

What is claimed is:

1. A cable with electromagnetic interference protection for an electric appliance, wherein a plurality of conductive clips are mounted on a fixing plate of the electric appliance and the conductive clips connect with a ground circuit of the electric appliance, the cable structure comprising:

a transmission wire connecting a plurality of elements of the electric appliance;

at least one ground wire contact position in an insulating layer of a ground wire of the cable to expose an internal conductive wire, wherein the ground wire contact position corresponds to a conductive clip position; and at least one metal ring clasping the transmission wire and the ground wire at the ground wire contact position to connect the metal ring with the internal conductive wire.

2. The cable of claim 1, wherein the conductive clips comprise metal clips.

3. The cable of claim 1, wherein the cable transmits a power and signals between the elements.

4. The cable of claim 1, wherein the internal conductive wire connects to the ground circuit of the electric appliance to transmit electromagnetic interference (EMI) noise to the ground circuit of the electric appliance by way of at least one of the conductive clips.

5. A liquid crystal display cable with electromagnetic interference protection for a notebook computer, wherein a plurality of conductive clips are mounted on a fixing plate of the electric appliance and the conductive clips connect to a ground circuit of the notebook computer, the liquid crystal display cable comprising:

a transmission wire connecting a liquid crystal display and a motherboard of the notebook computer;

at least one ground wire contact position in an insulating layer of a ground wire of the liquid crystal display cable to expose an internal conductive wire, wherein the ground wire contact position corresponds to a conductive clip position; and at least one metal ring clasping the transmission wire and the ground wire at the ground wire contact position to connect the metal ring with the internal conductive wire.

6. The liquid crystal display cable of claim 5, wherein the conductive clips comprise metal clips.

7. The liquid crystal display cable of claim 5, wherein the liquid crystal display cable transmits power and signals between the liquid crystal display and the motherboard of the notebook computer.

8. The liquid crystal display cable of claim 5, wherein the internal conductive wire connects with the ground circuit of the notebook computer to transmit electromagnetic interference (EMI) noise to the ground circuit of the notebook by way of at least one of the conductive clips.

9. A method of a cable assembly with electromagnetic interference protection for an electric appliance, the method comprising:

connecting conductive clips with a ground circuit of the electric appliance;

peeling off at least one portion of an insulating layer of a ground wire of the cable to expose an internal conductive wire in a ground wire position, wherein the ground wire position corresponds to a conductive clip position;

utilizing at least one metal ring to attach the ground wire at the ground wire position to the transmission wire of the cable; and pressing the metal ring, the transmission wire, and the ground wire into the conductive clips to mount the cable in the conductive clips and to connect the internal conductive wire with the ground circuit of the electric appliance by way of at least one of the conductive clips.

10. The method of claim 9, wherein the cable connects a plurality of elements in the electric appliance.

11. The method of claim 10, wherein the cable transmits power and signals between the elements.

12. The method of claim 9, wherein the internal conductive wire connects to the ground circuit of the electric appliance to transmit electromagnetic interference (EMI) noise to the ground circuit of the electric appliance.

13. The method of claim 9, wherein the electric appliance is a notebook computer with a liquid crystal display and a motherboard.

14. The method of claim 13, wherein the cable connects the liquid crystal display and the motherboard of the notebook computer.

15. The method of claim 14, wherein the cable transmits power and signals between the liquid crystal display and the motherboard of the notebook computer.

16. The method of claim 13, wherein the internal conductive wire connects to the ground circuit of the notebook computer to transmit electromagnetic interference (EMI) noise to the ground circuit of the notebook computer.

* * * * *

UNITED STATES PATENT AND TRADEMARK OFFICE

CERTIFICATE OF CORRECTION

PATENT NO. : 6,747,210 B2 
APPLICATION NO. : 10/301725
DATED : June 8, 2004
INVENTOR(S) : Cheng-Che Chen It is certified that error appears in the above-identified patent and that said Letters Patent is hereby corrected as shown below:

On the title page item (73), should read: Quantam Computer, Inc.

Signed and Sealed this

Twenty-eighth Day of November, 2006

JON W. DUDAS
*Director of the United States Patent and Trademark Office*

UNITED STATES PATENT AND TRADEMARK OFFICE

CERTIFICATE OF CORRECTION

PATENT NO. : 6,747,210 B2
APPLICATION NO. : 10/301725
DATED : June 8, 2004
INVENTOR(S) : Cheng-Che Chen It is certified that error appears in the above-identified patent and that said Letters Patent is hereby corrected as shown below:

Title Page
Item (73) Assignee:

Assignee should be corrected from: "QuantamComputer Inc." to

--Quanta Computer Inc.--

Signed and Sealed this

Twenty-ninth Day of April, 2008

JON W. DUDAS
*Director of the United States Patent and Trademark Office*